(12) United States Patent
Schmid et al.

(10) Patent No.: US 9,802,157 B2
(45) Date of Patent: Oct. 31, 2017

(54) DIFFUSER PLATE FOR AN EXHAUST AFTERTREATMENT MODULE

(71) Applicant: Caterpillar Inc., Peoria, IL (US)

(72) Inventors: Mark Lunau Schmid, Peoria, IL (US); Eric Paul Spaeth, Pekin, IL (US); Raymond U. Isada, Peoria, IL (US); Julian Justin, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 43 days.

(21) Appl. No.: 14/819,205

(22) Filed: Aug. 5, 2015

(65) Prior Publication Data

US 2017/0036165 A1 Feb. 9, 2017

(51) Int. Cl.
*F01N 3/28* (2006.01)
*B01D 53/94* (2006.01)
*F01N 3/20* (2006.01)

(52) U.S. Cl.
CPC ....... *B01D 53/9431* (2013.01); *F01N 3/2066* (2013.01); *B01D 53/9418* (2013.01); *B01D 2251/2062* (2013.01); *B01D 2251/2067* (2013.01); *B01D 2258/012* (2013.01); *F01N 3/2892* (2013.01); *F01N 2450/30* (2013.01); *F01N 2490/08* (2013.01); *F01N 2610/02* (2013.01)

(58) Field of Classification Search
None
See application file for complete search history.

(56) References Cited

U.S. PATENT DOCUMENTS

| | | | |
|---|---|---|---|
| 5,820,832 A | 10/1998 | Huttenhofer et al. | |
| 6,667,017 B2 | 12/2003 | Murrell et al. | |
| 6,710,013 B1 | 3/2004 | Kato et al. | |
| 7,451,594 B2 | 11/2008 | Blaisdell | |
| 8,901,033 B2 | 12/2014 | Trefzger et al. | |
| 2001/0053108 A1* | 12/2001 | Jahn | B01F 5/0682 366/337 |
| 2007/0101703 A1* | 5/2007 | Kanaya | B01D 53/9431 60/286 |
| 2007/0122317 A1* | 5/2007 | Driscoll | B01D 53/90 422/170 |
| 2010/0218490 A1* | 9/2010 | Forster | B01F 5/0451 60/324 |
| 2010/0269491 A1 | 10/2010 | Boorse et al. | |
| 2011/0167810 A1* | 7/2011 | Lebas | B01F 3/04049 60/324 |

(Continued)

FOREIGN PATENT DOCUMENTS

DE 102004043931 B4 8/2014
WO 2014084543 A1 6/2014

*Primary Examiner* — Walter D Griffin
*Assistant Examiner* — Jelitza Perez
(74) *Attorney, Agent, or Firm* — Miller, Matthias & Hull LLP (57) ABSTRACT

An aftertreatment module may include a housing with an inlet port and an outlet port. A selective catalytic reduction catalyst may be disposed between the inlet port and the outlet port. A diffuser plate may be disposed downstream of the inlet port and upstream of the selective catalytic reduction catalysts. The diffuser plate may include a first section including a first degree of porosity and a second section including a second degree of porosity. The first degree of porosity may be greater than the second degree of porosity.

15 Claims, 6 Drawing Sheets

(56) References Cited

U.S. PATENT DOCUMENTS

2013/0291498 A1 11/2013 Ganesan et al.
2014/0050626 A1 2/2014 Heidenreich
2014/0260209 A1 9/2014 Goss et al.
2014/0286832 A1 9/2014 Yi et al.
2015/0078976 A1 3/2015 Bui

* cited by examiner

DIFFUSER PLATE FOR AN EXHAUST AFTERTREATMENT MODULE

TECHNICAL FIELD

The present disclosure relates generally to an exhaust system and, more particularly, to a diffuser plate for an exhaust aftertreatment module in such a system.

BACKGROUND

Exhaust gases and particulates that are typically generated from internal combustion engines such as, for example, diesel engines, gasoline engines, and gaseous-fuel powered engines, generally need to be treated before entering the atmosphere to comply with emission standards. The engine exhaust for some engines, such as diesel engines, may include carbon monoxide, unburned hydrocarbons, and oxides of nitrogen ($NO_x$) as well as particulates. As part of some treatment processes, the exhaust gases may pass through an aftertreatment system which may include selective catalytic reduction (SCR) to reduce $NO_x$. As part of the SCR process, a reductant, such as urea or ammonia, is injected into the exhaust gas stream and adsorbed downstream onto an SCR catalyst or group of SCR catalysts. The SCR process converts $NO_x$ into diatomic nitrogen ($N_2$) and water ($H_2O$).

In particular, for an efficient SCR process, after the reductant is injected into the exhaust gas stream, the exhaust mass flow and reductant vapor should be distributed evenly across the SCR catalyst or group of SCR catalysts. While effective, some traditional vertical SCR designs, however, are challenged with distributing the exhaust mass flow and reductant vapor evenly across the SCR catalysts due to space requirements within the aftertreatment system. Moreover, such traditional vertical SCR designs are limited in providing a convenient aid to assist in assembling multiple stages of SCR catalysts.

U.S. Pat. No. 7,451,594 (the '594 patent) discloses an exhaust flow distribution device. The exhaust flow distribution device includes a concave plate having elongated distribution holes. The elongated distribution holes have a width that continuously increases as the hole extends from a central region outwardly to a peripheral edge. The '594 publication fails to disclose a distribution device that evenly distributes exhaust mass flow and reductant vapor onto catalysts and that aids in assembling multiple stages of catalysts.

SUMMARY

In accordance with an aspect of the disclosure, an aftertreatment module for treating exhaust of an engine is provided. The aftertreatment module may include a housing including an inlet port and an outlet port. A selective catalytic reduction catalyst may be disposed between the inlet port and the outlet port. A diffuser plate may be disposed downstream of the inlet port and upstream of the selective catalytic reduction catalyst. The diffuser plate may include a first section including a first degree of porosity and a second section including a second degree of porosity. The first degree of porosity may be greater than the second degree of porosity.

In accordance with another aspect of the disclosure, an aftertreatment system for an engine is provided. The aftertreatment system may include a reductant mixing module disposed downstream of and fluidly connected to a diesel particulate filter module. The reductant mixing module may include an injector and a mixer. The injector may be disposed upstream of the mixer wherein the mixer is configured to mix a reductant from the injector with an engine exhaust flow. An aftertreatment module may include an outlet port and an inlet port that may be fluidly connected to the reductant mixing module. A selective catalytic reduction catalyst may be disposed between the inlet port and the outlet port. A diffuser plate may be disposed downstream of the inlet port and upstream of the selective catalytic reduction catalyst. The diffuser plate may include a variable degree of porosity and may be configured to evenly distribute a composition of the engine exhaust mixed with the reductant.

In accordance with yet another aspect of the disclosure, a method of distributing a composition of engine exhaust flow mixed with a reductant evenly across a plurality of selective catalytic reduction catalysts in an aftertreatment module is provided. The method may entail receiving the composition through an inlet port of the aftertreatment module. Another step may be passing the composition through a strength-enhanced diffuser plate that may include a first section and a second section. The second section may surround the first section. The first section may include a first degree of porosity and the second section may include a second degree of porosity. The first degree of porosity may be greater than the second degree of porosity.

DETAILED DESCRIPTION

Figure 1:
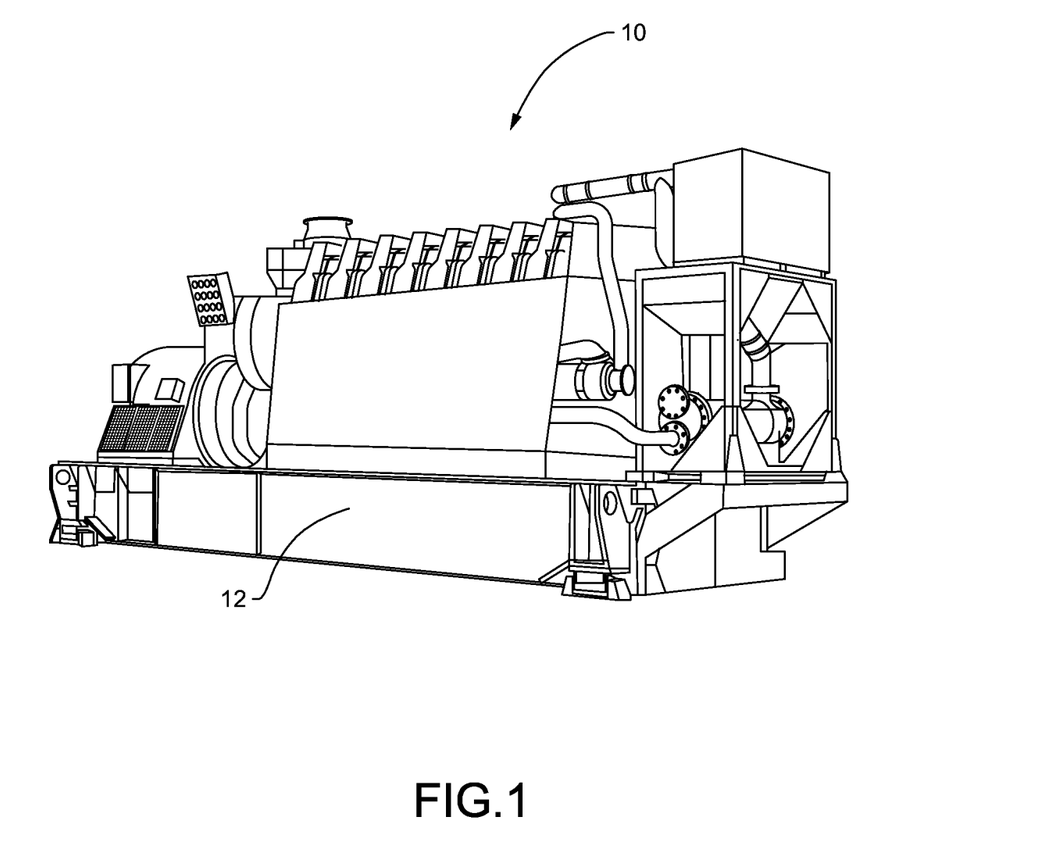
FIG. 1 is a side view of an exemplary engine, in accordance with an embodiment of the present disclosure.

Referring now to FIG. 1, an exemplary engine constructed in accordance with the present disclosure is generally referred to by reference numeral 10. The engine 10 may be any type of internal combustion engine such as, but not limited to, diesel engines, gasoline engines, and gaseous-fuel powered engines. The engine 10 may supply power to a stationary machine such as, but not limited to, an electrical power generator or a marine machine such as, but not limited to, a tugboat or a ferry. A base frame 12 may support the engine 10.

Figure 2:
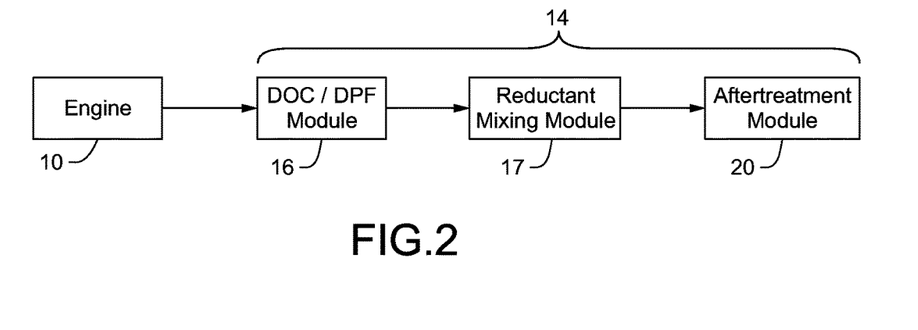
FIG. 2 is a schematic diagram illustrating an exemplary aftertreatment system, in accordance with an embodiment of the present disclosure.

As shown in FIG. 2, the engine 10 may be fluidly connected to an aftertreatment system 14 such that exhaust gases exiting the engine 10 may flow through the aftertreatment system 14 for treatment before passing to the atmosphere. The aftertreatment system 14 may include a diesel oxidation catalyst (DOC) or a diesel particulate filter (DPF) module 16, a reductant mixing module 17 including an injector 18 disposed upstream of a mixer 19 (both shown in FIG. 3), and an aftertreatment module 20, which may be, but is not limited to, a clean emissions module (CEM). For example, the DOC or DPF module 16 may be arranged downstream of the engine 10 to receive the exhaust gases produced by the engine 10. The DOC or DPF module 16 may be fluidly connected to the reductant mixing module 17. The DPF module 16 may remove diesel particulate matter or soot from the exhaust gases before the exhaust gases flow downstream to the reductant mixing module 17. As the exhaust gases flow through the reductant mixing module 17, a gaseous or liquid reductant, such as, but not limited to, urea, ammonia, and a water/urea solution, may be injected by the injector 18 and mixed with the exhaust gas flow by the mixer 19. The reductant mixing module 17 may be fluidly connected to the aftertreatment module 20 such that this composition may then flow downstream into the aftertreatment module 20 for further treatment of the exhaust gases before being discharged into the atmosphere, as described in more detail below.

Figure 3:
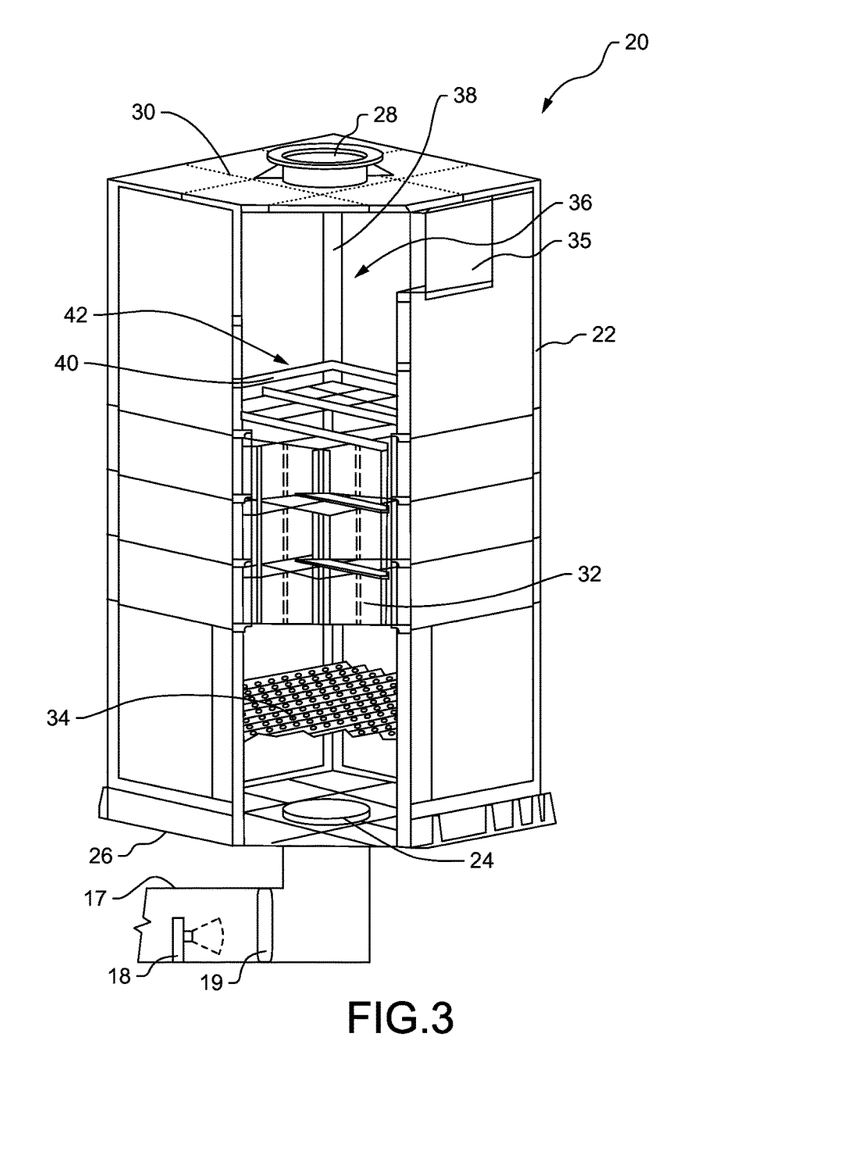
FIG. 3 is a perspective view of an exemplary aftertreatment module with portions sectioned and broken away to show details in accordance with an embodiment of the present disclosure.

As shown in FIG. 3, the aftertreatment module 20 may include a housing 22 having a rectangular cross section. The housing 22 may include an inlet port 24 located at an upstream end 26 and an outlet port 28 located at a downstream end 30. The inlet port 24 may be fluidly connected to the reductant mixing module 17 such that the aftertreatment module 20 receives the composition, that is mixed through the mixer 19, of the exhaust gas flow mixed with the reductant from the injector 18. The aftertreatment module 20 may also include a selective catalytic reduction catalyst (SCR) or a plurality of SCR catalysts 32 disposed within the housing 22 downstream of the inlet port 24 and upstream of the outlet port 28. The aftertreatment module 20 further includes a diffuser plate 34 disposed within the housing 22 downstream of the inlet port 24 and upstream of the plurality of SCR catalysts 32. The diffuser plate 34 may be disposed equidistant from the inlet port 24 and the plurality of SCR catalysts 32 as shown in FIG. 3, or may have other positions within the housing 22. An access panel 35 may be operatively disposed on the housing 22 such that the access panel 35 may be opened to provided access into the housing 22.

Figure 4:
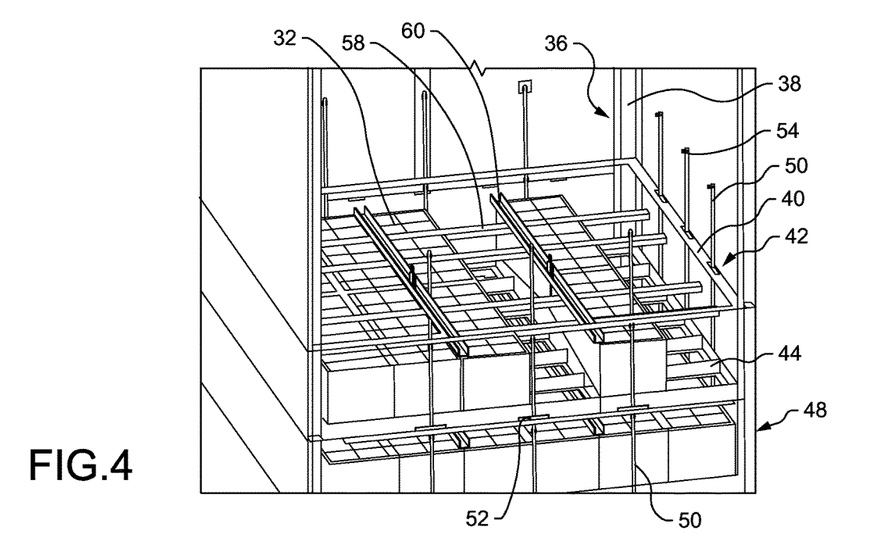
FIG. 4 is a detailed perspective view of the aftertreatment module of FIG. 3 with portions sectioned and broken away to show details in accordance with an embodiment of the present disclosure.

With reference to FIGS. 3 and 4, an internal housing frame 36 supports the housing 22. The housing frame 36 may include a plurality of elongated members 38 that extend in the direction of exhaust gas flow. The housing frame 36 may also include a plurality of cross members 40 that extend orthogonal to the plurality of elongated members 38 such that the plurality of cross members 40 interconnect with the plurality of elongated members 38 to form a shelf 42. The housing frame 36 may include multiple sets of the plurality of cross members 40 to form a plurality of shelves such that each shelf 42 may be equally spaced apart from one another. In an embodiment, the housing frame 36 may include at least three shelves.

Figure 5:
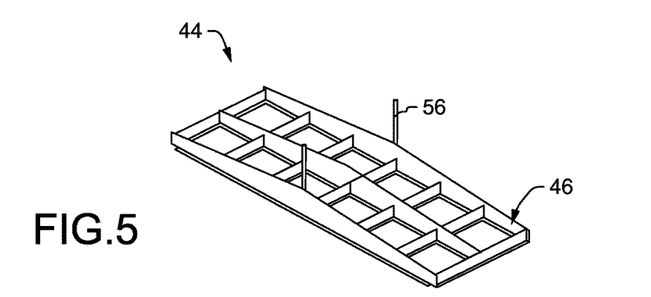
FIG. 5 is perspective view of a tray, in accordance with an embodiment of the present disclosure.
Figure 6:
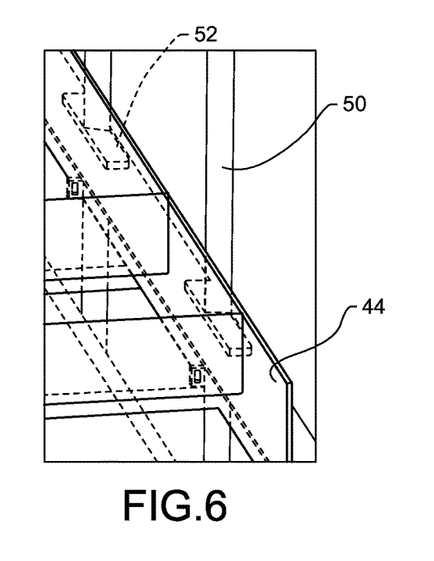
FIG. 6 is a detailed perspective view of FIG. 4.

Referring to FIGS. 4-6, a plurality of trays 44 for holding the plurality of SCR catalysts 32 may be supported by the shelf 42. As an example, the plurality of SCR catalysts 32 may be formed as an array of SCR cassettes with each cassette including 4 SCR catalysts grouped together. Each tray of the plurality of trays 44 may include an array of holders 46 arranged in a grid pattern. Each holder of the array of holders 46 may receive and hold an SCR cassette of the plurality of SCR catalysts 32 so that one side is exposed and facing upstream while an opposite side of the cassette is exposed and facing downstream. As an example, each tray of the plurality of trays 44 may include 12 holders in the array of holders 46 and may be arranged in a 2 by 6 grid, although other amounts of holders and grid arrangements are also within the scope of the present disclosure and appended claims.

Moreover, the plurality of SCR catalysts 32 may be arranged within the housing 22 of the aftertreatment module 20 to include at least one stage of SCR catalysts 48. In an embodiment, the aftertreatment module 20 may include three independently distinct stages of SCR catalysts 48 modularly arranged in serial flow. Each stage of SCR catalysts 48 may be modularly arranged to include three trays of the plurality of trays 44 with each tray holding 12 SCR cassettes of the plurality of SCR catalysts 32.

As best seen in FIGS. 4 and 6, a plurality of T-bars 50 constrain the plurality of trays 44 from movement in the direction of exhaust gas flow. Each of the T-bars of the plurality of T-bars 50 may include a T-end 52 that engages with the tray 44 such that the tray 44 is secured between the T-bar 50 and the shelf 42 when a pin end 54 of the T-bar 50 is pinned to the housing frame 36.

Figure 7:
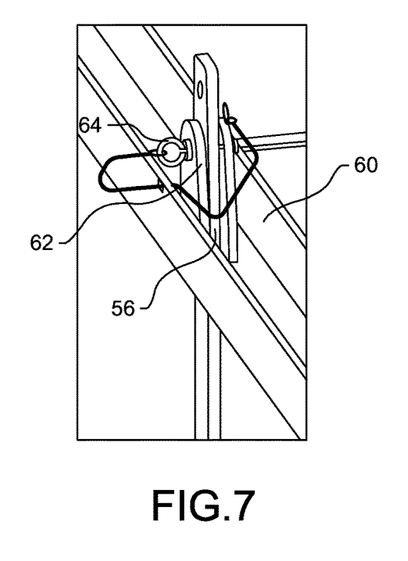
FIG. 7 is another detailed perspective view of FIG. 4.

As shown in FIG. 5, each tray of the plurality of trays 44 may include a plurality of flanges 56 that extend in the direction of exhaust gas flow. With the plurality of trays 44 secured to the shelf 42 and the plurality of SCR catalysts 32 placed in the array of holders 46, a plurality of cross bars 58 and a plurality of hold-down bars 60 may be arranged across the plurality of SCR catalysts 32 to secure the catalysts into the plurality of trays 44. The plurality of cross bars 58 may be strategically placed across the downstream-facing side of the plurality of catalysts 32 and the plurality of hold-down bars 60 may be placed orthogonally across the plurality of cross bars 58. Furthermore, as shown in FIG. 7, each hold-down bar of the plurality of hold-down bars 60 may include a female lug 62 that may receive a flange of the plurality of flanges 56. The female lug 62 may be pinned to the flange 56 by a locking pin 64 to secure the plurality of SCR catalysts 32 into the plurality of trays 44. It should be understood that each stage of the at least one stage of SCR catalysts 48 may be similarly arranged and assembled.

Figure 8:
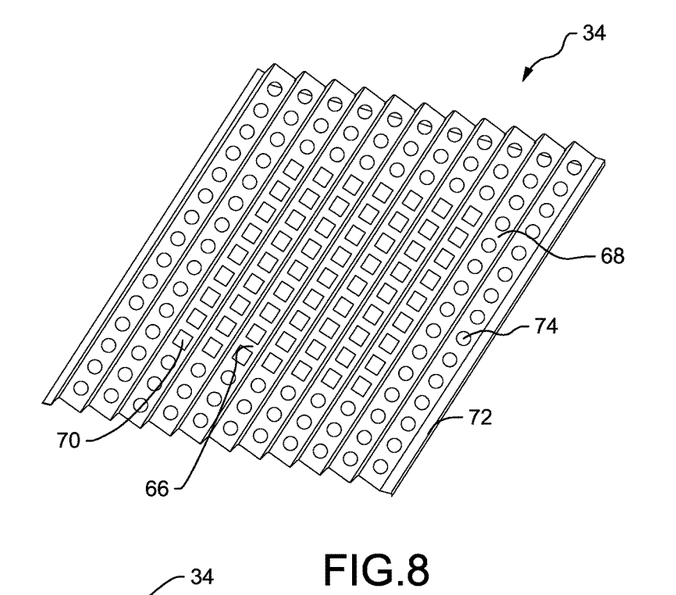
FIG. 8 is a perspective view of an exemplary diffuser plate, in accordance with an embodiment of the present disclosure.
Figure 9:
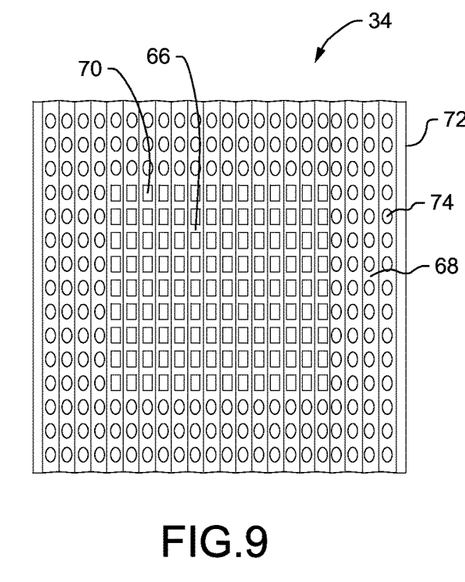
FIG. 9 is a plan view of the exemplary diffuser plate in FIG. 8, in accordance with an embodiment of the present disclosure.
Figure 10:
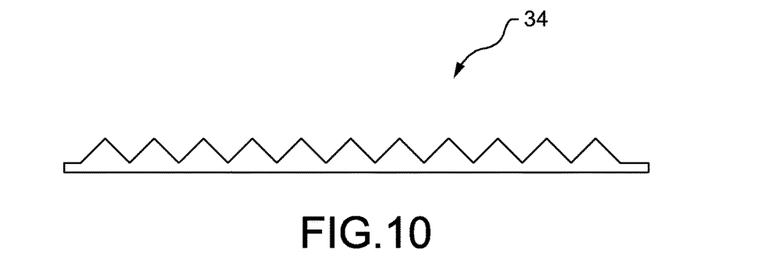
FIG. 10 is a side view of the exemplary diffuser plate in FIG. 8, in accordance with an embodiment of the present disclosure.

With reference to FIGS. 8-10, the diffuser plate 34 is configured to distribute the composition of the exhaust gas flow mixed with the reductant that flows through the inlet port 24 such that the composition may be evenly distributed across the upstream-facing sides of the plurality of SCR catalysts 32. The diffuser plate 34 may include a variable degree of porosity such that the diffuser plate 34 may include a first section 66 with a first degree of porosity and a second section 68 with a second degree of porosity. The first section 66 may be disposed centrally on the diffuser plate 34 and may include a first plurality of apertures 70. The second section 68 may surround the first section 66 and may extend outwardly therefrom to the outer periphery 72 of the diffuser plate 34. The second section 68 may include a second plurality of apertures 74. The first plurality of apertures 70 may be designed and arranged relative to the second plurality of apertures 74 such that the first degree of porosity of the first section 66 may be greater than the second degree of porosity of the second section 68. In this manner, although counterintuitive, the second section 68 restricts the flow more than through the first section 66 such that the composition may be evenly distributed across the upstream-facing sides of the plurality of SCR catalysts 32. As an example, the first degree of porosity may be defined as total volume of the first plurality of apertures 70 over the total volume of the first section 66 while the second degree of porosity may be defined as the total volume of the second plurality of apertures 74 over the total volume of the second section 68. In an embodiment, each aperture of the first plurality of apertures 70 may have a first cross-sectional area that is greater than a second cross-sectional area of each aperture of the second plurality of apertures 74. As a non-limiting example, the first plurality of apertures 70 may include 126 rectangular apertures with dimensions of 80 millimeters by 66.8 millimeters while the second plurality of apertures 74 may include 204 circular apertures with a diameter of 70 millimeters.

Furthermore, the outer periphery 72 of the diffuser plate 34 may be connected to the housing frame 36 by welding or other comparable techniques known in the industry. The diffuser plate 34 may be strength-enhanced such that, in an embodiment, it is corrugated to include, as an example, a saw tooth profile, as seen in the side view of FIG. 10, providing robust rigidity thereto. That is, the diffuser plate 34 may have a relatively thin and uniform thickness that is formed, molded, or otherwise shaped to have alternating peaks and troughs, as would be understood by the term "corrugated." The corrugation of the diffuser plate 34 may also reduce weight therefrom and still maintain a robustness. As an example, with the diffuser plate 34 already welded to the housing frame 36, during the assembly of the aftertreatment module 20, the strength-enhanced corrugation of the diffuser plate 34 may support additional weight such that an assembly person may stand on the diffuser plate 34 to aid in the process of assembling the plurality of SCR catalysts 32.

Figure 11:
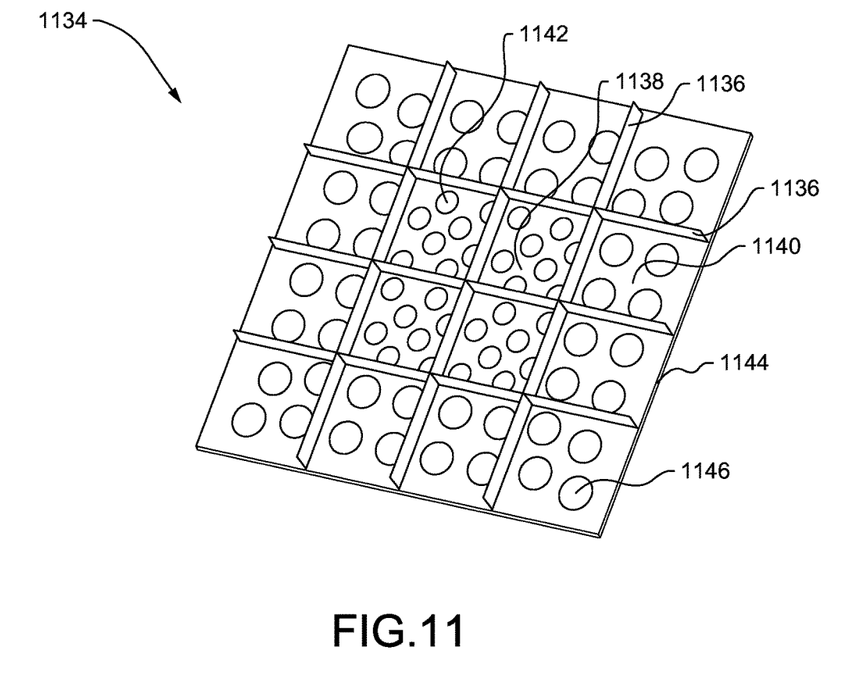
FIG. 11 is a perspective view of an alternative exemplary embodiment of a diffuser plate, in accordance with an embodiment of the present disclosure.

As shown in FIG. 11, in an exemplary embodiment, a diffuser plate 1134 is also configured to distribute the composition of the exhaust gas flow mixed with the reductant that flows through the inlet port 24 such that the composition may be evenly distributed across the upstream-facing sides of the plurality of SCR catalysts 32, but differs from the diffuser plate 34 in that it includes a planar, un-corrugated profile. The diffuser plate 1134 may also be strength-enhanced such that it may include a plurality of ribs 1136 that intersect with each other to form a grid pattern and provide robust rigidity. The plurality of ribs 1136 may provide added strength to the diffuser plate 1134 to aid in the assembly process. Similar to the diffuser plate 34, the diffuser plate 1134 includes a first section 1138 with a first degree of porosity and a second section 1140 with a second degree of porosity. The first section 1138 may also be disposed centrally on the diffuser plate 1134 and may include a first plurality of apertures 1142. The second section 1140 may surround the first section 1140 and may extend outwardly therefrom to the outer periphery 1144 of the diffuser plate 1134. The second section 1140 may include a second plurality of apertures 1146. The first plurality of apertures 1142 may be designed and arranged relative to the second plurality of apertures 1146 such that the first degree of porosity of the first section 1138 may be greater than the second degree of porosity of the second section 1140. As a non-limiting example, the first and second plurality of apertures 1142, 1146 may be circular, but may have other suitable shapes as well.

Figure 12:
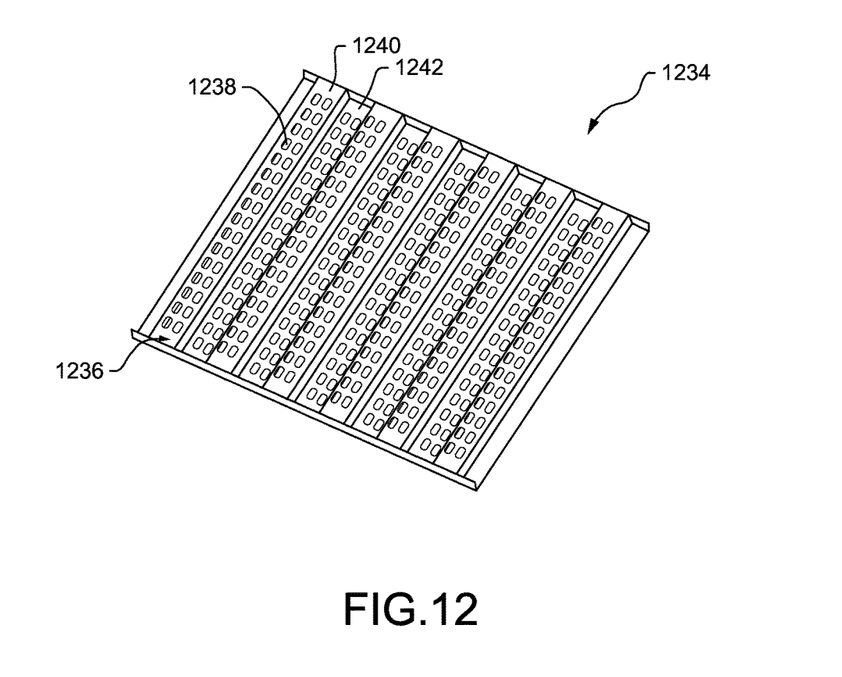
FIG. 12 is a perspective view of another alternative exemplary embodiment of a diffuser plate, in accordance with an embodiment of the present disclosure.

As shown in FIG. 12, in another alternative embodiment, a diffuser plate 1234 is configured to provide similar functionality as the diffuser plates 34, 1134, but with a differing profile structure. The diffuser plate 1234 is also strength-enhanced, such that it may include an array of alternating upper and lower tiers 1236 with each tier including a plurality of apertures 1238, to provide robust rigidity and aid in the assembly process. The array of alternating upper and lower tiers 1236 may include a plurality of upper tiers 1240 and a plurality of lower tiers 1242. The array of alternating upper and lower tiers 1236 may be patterned such that each consecutive upper tier 1240 may be interspersed with a lower tier 1242. The plurality of lower tiers 1242 are offset a suitable distance, in the direction of the exhaust gas flow, from the plurality of upper tiers 1240.

INDUSTRIAL APPLICABILITY

In operation, the engine 10 may produce exhaust gases that are passed through the DOC or DPF module 16 to remove diesel particulate matter or soot from the exhaust gases before flowing downstream to the reductant mixing module 17. Within the reductant mixing module 17, a reductant is injected into the exhaust gases creating a composition that flows into the aftertreatment module 20 via the inlet port 24. The composition then passes through the diffuser plate 34. Because the first section 66 has a degree of porosity that is greater than the second section 68, the composition flows out of the diffuser plate 34 at a substantially uniform flow rate such that the composition may be evenly distributed across the plurality of SCR catalysts 32. In an embodiment, the diffuser plate 34 may be disposed equidistant from the inlet port 24 and the plurality of SCR catalysts 32 to assist in the even distribution of the composition across the plurality of SCR catalysts 32.

Figure 13:
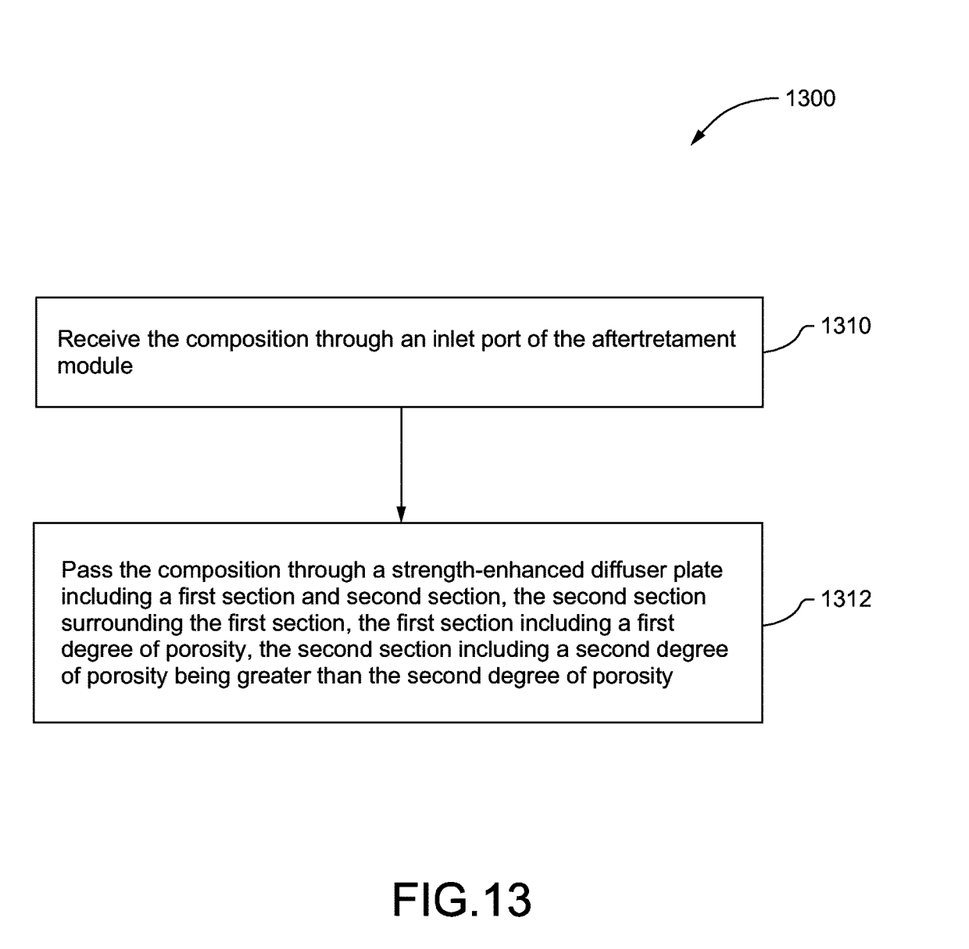
FIG. 13 is a flow chart illustrating a sample sequence of steps which may be practiced in accordance with an embodiment of the present disclosure.

FIG. 13 illustrates a flow chart 1300 of a sample sequence of steps which may be performed to distribute a composition of engine exhaust flow mixed with a reductant evenly across a plurality of selective catalytic reduction catalysts in an aftertreatment module. Box 1310 depicts the step of receiving the composition through an inlet port of the aftertreatment module. Another step, as illustrated in box 1312, is passing the composition through a strength-enhanced diffuser plate including a first section and a second section. The second section may surround the first section. The first section may include a first degree of porosity and the second section may include a second degree of porosity. The first degree of porosity may be greater than the second degree of porosity. Yet another step may be providing the diffuser plate upstream of the inlet port and downstream of the plurality of selective catalytic reduction catalysts. A further step may be positioning the diffuser plate to be equidistant from the inlet port and the plurality of selective catalytic reduction catalysts.

Based on the foregoing, it can be seen that the present disclosure sets forth apparatus and methods for distributing a composition of engine exhaust flow mixed with a reductant evenly across a plurality of selective catalytic reduction catalysts in an aftertreatment module. Furthermore, through the novel teachings set forth above, the modularity of each stage of the at least one stage of SCR catalysts may effectively and efficiently assist in assembling or racking each stage within the aftertreatment module. The teachings of this disclosure may also be employed to further assist in assembling each stage of SCR catalysts by providing a robust, yet light weight, diffuser plate that supports additional weight during the assembly process.

What is claimed is:

1. An aftertreatment module for treating exhaust of an engine, the aftertreatment module comprising:
   a housing including an inlet port and an outlet port;
   a selective catalytic reduction catalyst being disposed between the inlet port and the outlet port; and
   a diffuser plate disposed downstream of the inlet port and upstream of the selective catalytic reduction catalyst, the diffuser plate including a first section at a center portion of the diffuser plate and a second section that surrounds the first section,
   wherein the first section includes a first group of first apertures, each of the first apertures having a same configuration with a first unrestricted cross-sectional area aligned with a surface of the diffuser plate to provide a first unrestricted flow passage through the surface, where the first section is configured to have a first degree of porosity,
   wherein the second section includes a second group of second apertures, each of the second apertures having a same configuration, different from the same configuration of the first apertures, with a second unrestricted cross-sectional area, different from the first unrestricted cross-sectional area, to provide a second unrestricted flow passage through the surface, where the second section is configured to have a second degree of porosity, and
   wherein the first degree of porosity is greater than the second degree of porosity such that the second section provides a greater flow restriction than the first section such that exhaust passing through the diffuser plate is evenly distributed at an output side of the diffuser plate.

2. The aftertreatment module of claim 1, wherein the diffuser plate includes a plurality of intersecting ribs forming a grid pattern.

3. The aftertreatment module of claim 1, wherein the diffuser plate is disposed equidistant from the inlet port and the selective catalytic reduction catalyst.

4. The aftertreatment module of claim 1, wherein the selective catalytic reduction catalyst includes first, second, and third independently distinct stages of selective catalytic reduction catalysts, the second stage of selective catalytic reduction catalysts being modularly disposed downstream of the first stage of selective catalytic reduction catalysts.

5. The aftertreatment module of claim 1, wherein the diffuser plate is corrugated to provide robust rigidity.

6. The aftertreatment module of claim 5, wherein the diffuser plate is arranged horizontally in the housing.

7. The aftertreatment module of claim 6, wherein the second unrestricted cross-sectional area is less than the first unrestricted cross-sectional area.

8. The aftertreatment module of claim 1, wherein a total number of the first apertures of the first group of apertures is less than a total number of second apertures of the second group of apertures.

9. The aftertreatment module of claim 1,
   wherein each of the first apertures of the first group of apertures is rectangular, and
   wherein each of the second apertures of the second group of apertures is one of circular or oval.

10. The aftertreatment module of claim 1,
    wherein each of the first apertures of the first group of apertures is circular, and
    wherein each of the second apertures of the second group of apertures is circular.

11. The aftertreatment module of claim 1, wherein a first total area of the first apertures of the first group of apertures is less than a second total area of the second apertures of the second group of apertures.

12. The aftertreatment module of claim 1, wherein an entire perimeter of the diffuser plate in a top plan view is solid and free of any apertures.

13. The aftertreatment module of claim 1, wherein a central axis of the aftertreatment module passes through respective center portions of the inlet port, the outlet port, the selective catalytic reduction catalyst, and the diffuser plate.

14. The aftertreatment module of claim 1, wherein the first group of first apertures and the second group of second apertures are disposed inward and away from a perimeter of the diffuser plate.

15. The aftertreatment module of claim 1, wherein the first apertures are uniformly spaced relative to each other, and the second apertures are uniformly spaced relative to each other.

* * * * *